US012043032B2

(12) United States Patent
Kurokawa

(10) Patent No.: US 12,043,032 B2
(45) Date of Patent: Jul. 23, 2024

(54) CONTROL METHOD OF IMAGE FORMING APPARATUS, AND IMAGE FORMING APPARATUS

(71) Applicant: KYOCERA Document Solutions Inc., Osaka (JP)

(72) Inventor: Yuichiro Kurokawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 179 days.

(21) Appl. No.: 17/844,163

(22) Filed: Jun. 20, 2022

(65) Prior Publication Data

US 2022/0402263 A1 Dec. 22, 2022

(30) Foreign Application Priority Data

Jun. 21, 2021 (JP) ................................ 2021-102275

(51) Int. Cl.

| | |
|---|---|
| ***B41J 2/045*** | (2006.01) |
| ***B41J 11/00*** | (2006.01) |
| ***B41J 11/42*** | (2006.01) |

(52) U.S. Cl.

CPC ....... *B41J 2/04573* (2013.01); *B41J 2/04586* (2013.01); *B41J 11/007* (2013.01); *B41J 11/42* (2013.01)

(58) Field of Classification Search

CPC ...... B41J 25/34; B41J 2202/20; B41J 25/304; B41J 25/001; B41J 11/007; B41J 2/04586; B41J 29/393; B41J 2/01; B41J 11/42; B41J 2/04573; B41J 2/04501

See application file for complete search history.

(56) References Cited

FOREIGN PATENT DOCUMENTS

JP 2008132707 A 6/2008

*Primary Examiner* — Jannelle M Lebron

(74) *Attorney, Agent, or Firm* — Alleman Hall & Tuttle LLP

(57) ABSTRACT

A processor measures a pulse interval for a plurality of rotational phases of a rotary encoder, respectively. Each time the pulse interval is measured, the processor accumulates a measured value, which is the pulse interval or a moving average of the pulse interval of time-series data in association with corresponding one of the plurality of rotational phases, and records the measured value in a storage device. The processor derives a plurality of reference values corresponding to the plurality of rotational phases. Each time the measured value is newly obtained, the processor derives a correction value of a time interval of ink ejection of the inkjet recording apparatus in accordance with a difference between the measured value that is newly obtained and a corresponding reference value. The corresponding reference value corresponds to one of the rotational phases which corresponds to the measured value that is newly obtained.

5 Claims, 5 Drawing Sheets

CONTROL METHOD OF IMAGE FORMING APPARATUS, AND IMAGE FORMING APPARATUS

INCORPORATION BY REFERENCE

This application is based upon and claims the benefit of priority from the corresponding Japanese Patent Application No. 2021-102275 filed on Jun. 21, 2021, the entire contents of which are incorporated herein by reference.

BACKGROUND

The present disclosure relates to a control method of an image forming apparatus provided with a conveyance belt that conveys a sheet, and the image forming apparatus.

An image forming apparatus using an inkjet method includes an inkjet recording apparatus that forms an image on a sheet to be conveyed by ejecting ink onto the sheet. The image forming apparatus may include a conveyance belt that conveys the sheet. The conveyance belt is rotatably supported by a plurality of supporting rollers.

A rotation speed of the conveyance belt varies depending on various kinds of fluctuation factors. The fluctuation factors include, for example, rotation unevenness of a drive motor, or a load to which the conveyance belt receives from the sheet when the sheet reaches the conveyance belt.

The fluctuation of the rotation speed of the conveyance belt appears as fluctuation of a conveyance speed of the sheet. When the conveyance speed of the sheet fluctuates, the inkjet recording apparatus ejects ink at a predetermined reference interval, which causes distortion on the image.

Then, the image forming apparatus may include a rotary encoder attached to one of the supporting rollers. In this case, a pulse interval, which is a time interval of a pulse outputted by the rotary encoder, is measured. In addition, a time interval of ink ejection of the inkjet recording apparatus is corrected in accordance with a difference between the pulse interval and the reference interval.

SUMMARY

A control method of an image forming apparatus according to one aspect of the present disclosure is a method for controlling an image forming apparatus including a conveyance belt, an inkjet recording apparatus, a rotor, and a rotary encoder. The image forming apparatus includes a conveyance belt, an inkjet recording apparatus, a rotor, and a rotary encoder. The conveyance belt is driven in rotation to convey a sheet. The inkjet recording apparatus forms an image on the sheet by ejecting ink onto the sheet conveyed by the conveyance belt. The rotor rotates in conjunction with the conveyance belt. The rotary encoder outputs a pulse each time the rotor rotates by a predetermined unit angle. The control method includes measuring, by a processor, a pulse interval, which is a time interval between the pulse newly outputted from the rotary encoder and a last pulse, for a plurality of rotational phases of the rotary encoder, respectively. The control method further includes, each time the pulse interval is measured, accumulating, by the processor, a measured value, which is the pulse interval or a moving average of time-series data of the pulse interval in association with corresponding one of the plurality of rotational phases, and recording the measured value in the storage device. The control method further includes deriving, by the processor, a plurality of reference values corresponding to the plurality of rotational phases based on measured value data recorded in the storage device. The control method further includes, each time the measured value is newly obtained, deriving, by the processor, a correction value of a time interval of ink ejection of the inkjet recording apparatus in accordance with a difference between the measured value that is newly obtained and a corresponding reference value that is one of the plurality of reference values. Each of the plurality of reference values is a representative value of data for a predetermined plurality of cycle numbers corresponding to each of the plurality of rotational phases in the measured value data. The corresponding reference value corresponds to one of the rotational phases, which corresponds to the measured value that is newly obtained. The control method further includes correcting, by the processor, a time interval of ink ejection of the inkjet recording apparatus in accordance with the correction value.

An image forming apparatus according to another aspect of the present disclosure includes the conveyance belt, the inkjet recording apparatus, the rotor, and the rotary encoder. The image forming apparatus further includes a processor achieving the control method.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings. The following embodiment is an example that embodies the present disclosure, and does not limit a technical scope of the present disclosure.

Configuration of Image Forming Apparatus 10

The image forming apparatus 10 according to the embodiment executes a print processing that forms an image on a sheet 9.

Figure 1:
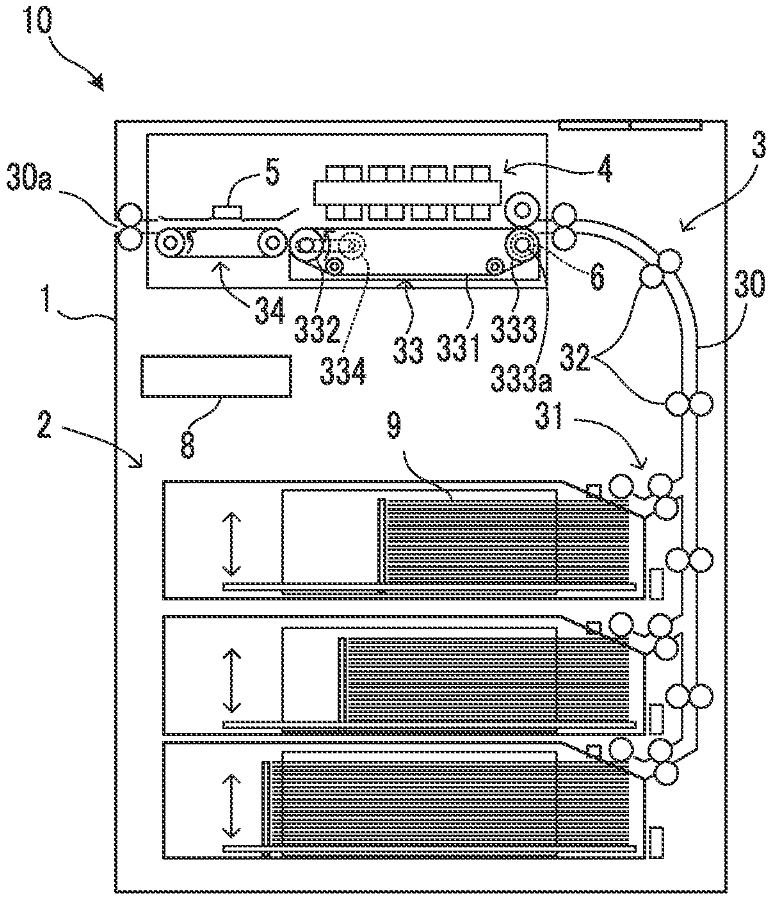
FIG. 1 is a configuration diagram of an image forming apparatus according to an embodiment.

As illustrated in FIG. 1, the image forming apparatus 10 includes a main body 1, a sheet storing portion 2, a sheet conveying device 3, an inkjet recording apparatus 4, a heater 5, and a control device 8.

The main body 1 is a housing. The sheet storing portion 2, the sheet conveying device 3, the inkjet recording apparatus 4, the heater 5, and the control device 8 are housed in the main body 1.

The sheet storing portion 2 stores a plurality of sheets 9. The sheet conveying device 3 feeds out each of the sheets 9 inside the sheet storing portion 2 to a conveyance path 30 inside the main body 1, and conveys each of the sheets 9 along the conveyance path 30.

The sheet conveying device 3 includes a sheet feeding device 31, a plurality of pairs of conveyance rollers 32, a first belt conveying device 33, and a second belt conveying device 34.

The sheet feeding device 31 feeds out the plurality of sheets 9 inside the sheet storing portion 2 to the conveyance path 30 one by one. The plurality of pairs of conveyance rollers 32 conveys each of the sheets 9 having fed out by the sheet feeding device 31 along the conveyance path 30, and discharges each of the sheets 9 onto which an image is formed from a discharge port 30*a* of the conveyance path 30.

A connection unit (not illustrated) is connected to the main body 1. The connection unit receives and accumulates the sheet 9 discharged from the discharge port 30*a* of the conveyance path 30, the sheet 9 onto which the image has been formed.

The first belt conveying device 33 is disposed at a print position in the conveyance path 30. The first belt conveying device 33 takes over the conveyance of each of the sheets 9 from a part of the plurality of pairs of conveyance rollers 32 at the print position.

In addition, the first belt conveying device 33 conveys each of the sheets 9 to a dry position in the conveyance path 30. The dry position is a subsequent stage position with respect to the print position in the conveyance path 30.

The first belt conveying device 33 includes an endless conveyance belt 331, a plurality of supporting rollers 332, 333, and a drive motor 334. The plurality of supporting rollers 332, 333 rotatably supports the conveyance belt 331.

The conveyance belt 331 is driven in rotation by the drive motor 334. The conveyance belt 331, on its upper surface onto which each of the sheets 9 is placed, conveys each of the sheets 9.

The second belt conveying device 34 takes over the conveyance of the sheet 9 from the first belt conveying device 33. In addition, the second belt conveying device 34 conveys each of the sheets 9 from the dry position in the conveyance path 30 to a further subsequent stage.

The inkjet recording apparatus 4 ejects ink with respect to each of the sheets 9 that is conveyed by the conveyance belt 331 of the first belt conveying device 33, thereby forming the image on each of the sheets 9.

The heater 5 heats the ink on each of the sheets that is conveyed by the second belt conveying device 34. Accordingly, the heater 5 dries the ink on each of the sheets 9.

The control device 8 executes various data processes and controls of the image forming apparatus 10.

Figure 2:
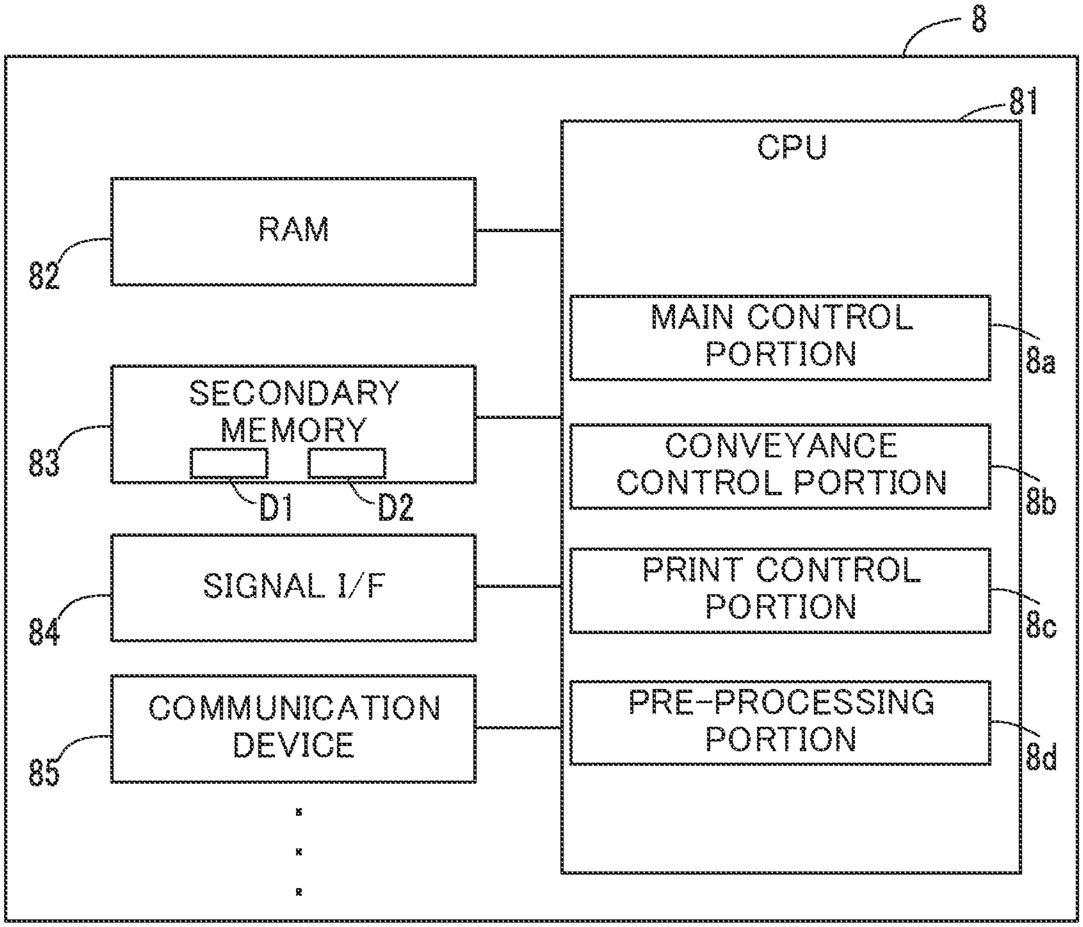
FIG. 2 is a block diagram of a configuration of a control device in the image forming apparatus according to the embodiment.

As illustrated in FIG. 2, the control device 8 has a CPU (Central Processing Unit) 81 and peripherals of the CPU 81. The peripherals includes a RAM (Random Access Memory) 82, a secondary memory 83, a signal interface 84, and the like.

The secondary memory 83 is a computer readable non-volatile storage memory. The secondary memory 83 can store and update computer programs and various kinds of data. For example, one of or both a flash memory and a hard disk drive is adopted as the secondary memory 83.

The signal interface 84 converts signals outputted by various sensors into digital data, and transmits the converted digital data to the CPU 81. Furthermore, the signal interface 84 converts control commands outputted by the CPU 81 into control signals, and transmits the control signals to a device to be controlled.

In addition, the control device 8 includes a communication device 85. The communication device 85 executes communication with other information processing devices such as a host device. The host device transmits a print job to the image forming apparatus 10. The CPU 81 communicates with other information processing devices through the communication device 85.

The CPU 81 is a processor that executes the computer program to execute processes and controls of various kinds of data. The RAM 82 is a computer-readable volatile memory. The RAM 82 temporarily stores the computer program executed by the CPU 81, and data to be outputted and referenced in a process of executing various processes by the CPU 81.

The CPU 81 has a plurality of processing modules realized by executing the computer program. The plurality of processing modules includes a main control portion 8*a*, a conveyance control portion 8*b*, a print control portion 8*c*, and the like.

The main control portion 8*a* executes a control to start various processes in accordance with an operation for an operating device (not illustrated) and upon reception of data from other devices. In addition, the main processing portion 8*a* also executes a control of a display device (not illustrated).

The conveyance control portion 8*b* controls the sheet conveying device 3. Accordingly, the conveyance control portion 8*b* controls feeding of each of the sheets 9 from the sheet storing portion 2 and conveyance of each of the sheets 9. The print control portion 8*c* causes, in synchronization with the conveyance of each of the sheets 9 by the sheet conveying device 3, the print device 4 to execute the print processing.

In the first belt conveying device 33, a rotation speed of the conveyance belt 331 fluctuates depending on various kinds of fluctuation factors. For example, the fluctuation factors include, for example, rotation unevenness of the drive motor 334, or a load in which the conveyance belt 331 receives from a sheet 9 when the sheet 9 reaches the conveyance belt 331.

The fluctuation of the rotation speed of the conveyance belt 331 appears as fluctuation of a conveyance speed of each of the sheets 9. When the conveyance speed of each of the sheets 9 fluctuates, the inkjet recording apparatus 4 ejects the ink at a predetermined reference interval, which causes distortion on the image.

Then, the image forming apparatus 10 includes a rotary encoder 6 attached to one of the plurality of supporting rollers 332, 333. A pulse interval, which is a time interval of a pulse outputted by the rotary encoder 6, is measured. A time interval of ink ejection of the inkjet recording apparatus 4 is corrected based on the pulse interval.

The plurality of supporting rollers 332, 333 supporting the conveyance belt 331 corresponds to a drive roller 332 and a driven roller 333. The drive roller 332 is driven in rotation by the drive motor 334.

The drive roller 332 causes the conveyance belt 331 to be rotated. That is, the drive motor 334 rotationally drives the conveyance belt 331 through the drive roller 332. The driven roller 333 rotates along with the rotation of the conveyance belt 331.

The driven roller 333 is an example of a rotor that is rotated in conjunction with the conveyance belt 331. Fluctuation factors of the rotation speed of the driven roller 333 include the load to the conveyance belt 331, and fluctuation factors regarding the drive motor 334 and the drive roller 332. In addition, the fluctuation factors of the rotation speed of the driven roller 333 includes fluctuation factors regarding the driven roller 333.

For example, the fluctuation factors regarding the driven roller 333 include a state of eccentric of a rotation shaft 333*a* of the driven roller 333 or vibration of the driven roller 333.

However, the fluctuation factors regarding the driven roller 333 does not affect the rotation speed of the conveyance belt 331. That is, the fluctuation factors regarding the driven roller 333 do not affect the conveyance speed of a sheet 9.

In addition, the rotary encoder 6 may be attached to the driven roller 333. In the present embodiment, the rotary encoder 6 is attached to the rotation shaft 333*a* of the driven roller 333 (see FIG. 3).

Figure 3:
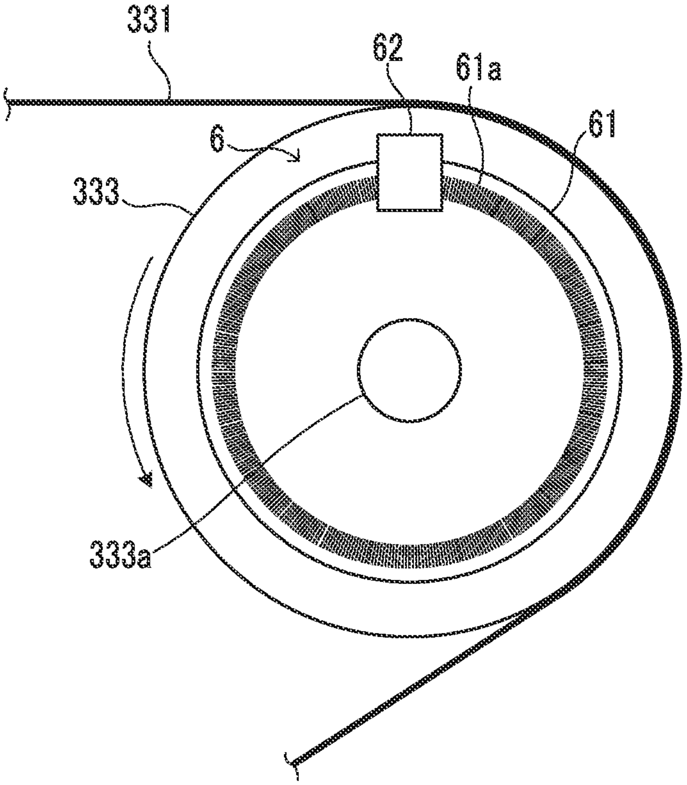
FIG. 3 is a diagram of a configuration of a rotary encoder in the image forming apparatus according to the embodiment.

As illustrated in FIG. 3, the rotary encoder 6 includes a pulse plate 61 and a detection sensor 62. The pulse plate 61 is connected to the rotation shaft 333*a* of the driven roller 333. Accordingly, the pulse plate 61 is integrally formed with the rotation shaft 333*a* of the driven roller 333.

The pulse plate 61 has, along its circumferential direction, a plurality of marks 61*a* arranged at a constant pitch. Each of the marks 61*a* is a thin line, a slit, and the like, formed on a surface of the pulse plate 61.

The detection sensor 62 detects each of the marks 61*a* at a predetermined position. For example, the detection sensor 62 is a photo sensor, a capacitance sensor, or the like. The detection sensor 62 outputs a pulse each time the detection sensor 62 detects a mark 61*a*.

The marks 61*a* corresponds to a plurality of rotational phases of the rotary encoder 6, respectively. It can be said that the plurality of rotational phases of the rotary encoder 6 is a plurality of rotational phases of the driven roller 333.

Each time the pulse plate 61 and the driven roller 333 rotate by a predetermined unit angle, one of the plurality of marks 61*a* is detected by the detection sensor 62. When the number of marks 61*a* is (N+1), the unit angle is 180/N (degree).

Therefore, the rotary encoder 6 outputs the pulse each time the driven roller 333 rotates by the predetermined unit angle.

When the rotary encoder 6 is attached to the driven roller 333, the pulse interval of the rotary encoder 6 may fluctuate due to causes which are not related to the conveyance speed of a sheet 9. Thus, the time interval of ink ejection of the inkjet recording apparatus 4 may be incorrectly corrected.

When the time interval of ink ejection of the inkjet recording apparatus 4 is incorrectly corrected, distortion on the image is caused.

The plurality of processing modules in the CPU 81 further includes a pre-processing portion 8*d* (see FIG. 2). The pre-processing portion 8*d* executes a pre-correcting process which will be described later. The pre-correcting process is executed, which derives a plurality of reference values V2 which will be described later (see FIG. 4).

Figure 4:
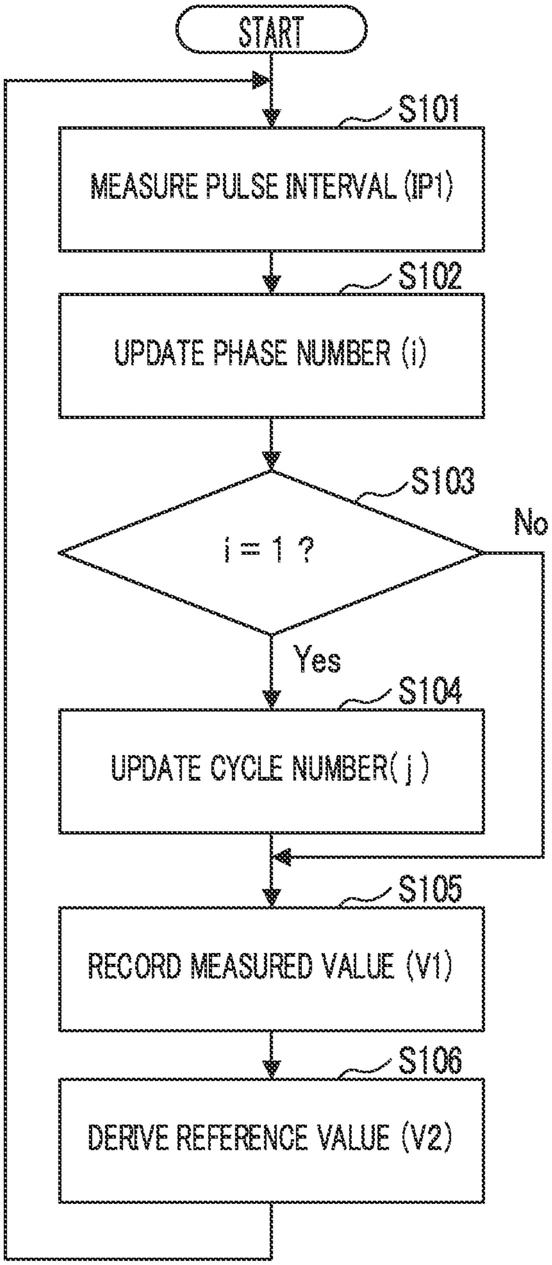
FIG. 4 is a flowchart of an example of steps of a pre-correcting process in the image forming apparatus according to the embodiment.

In addition, the print control portion 8*c* uses the plurality of reference values V2 to correct the time interval of ink ejection of the inkjet recording apparatus 4 (see FIG. 4). Accordingly, the time interval of ink ejection of the inkjet recording apparatus 4 can be correctly corrected depending on the pulse interval of the rotary encoder 6.

Pre-Correcting Process

In the following, an example of steps of the pre-correcting process will be described with reference to a flowchart illustrated in FIG. 4.

The pre-processing portion 8*d* executes the pre-correcting process when the drive motor 334 is operated. In the following description, Steps S101, S102, . . . represent identification codes of a plurality of steps in the pre-correcting process.

The pre-processing portion 8*d* firstly executes a process of Step S101 in the pre-correcting process. In the following description, a time interval between the pulse newly outputted from the rotary encoder 6 and a last pulse is referred to as a pulse interval IP1.

Step S101

In Step S101, the pre-processing portion 8*d* measures the pulse interval IP1 during a time from an output of one pulse from the rotary encoder 6 to an output of a subsequent pulse. After that, the pre-processing portion 8*d* shifts the process to Step S102.

Step S102

In Step S102, the pre-processing portion 8*d* updates a phase number i and shifts the process to Step S103.

The phase number i is the number that identifies each of the rotational phases of the rotary encoder 6. For example, when the unit angle is 180/N (degree), the phase number i is one of 1 to N. The phase number i is also the number that identifies each of the rotational phases of the driven roller 333.

When the original phase number i is one of 1 to (N−1), the pre-processing portion 8*d* adds 1 to the original phase number i, thereby updating the phase number i. When the original phase number i is N, the pre-processing portion 8*d* updates the phase number i to 1.

Therefore, the phase number i is updated to 1 each time the driven roller 333 rotate once.

Step S103

In Step S103, the pre-processing portion 8*d* determines whether or not the updated phase number i is 1.

When the pre-processing portion 8*d* determines that the updated phase number i is 1, the process is shifted to Step S104. On the other hand, when the pre-processing portion 8*d* determines that the updated phase number i is 1, the process is shifted to Step S105.

Step S104

In Step S104, the pre-processing portion 8*d* updates a cycle number j, and shifts the process to Step S105.

The cycle number j is the number that is updated within a range between 1 and M each time the driven roller 333 rotates once. M is a predetermined plurality of cycle numbers. For example, M is an integer of 20 or more and less than 50. It can be said that M is a predetermined plurality of rotation numbers of the driven roller 333.

When the original cycle number j is one of 1 to (M−1), the pre-processing portion 8*d* updates the cycle number j by adding 1 to the original cycle number j. When the original cycle number j is M, the pre-processing portion 8*d* updates the cycle number j to 1.

Step S105

In Step S105, the pre-processing portion 8*d* records a measured value V1 in the secondary memory 83. The measured value V1 is the pulse interval IP1 measured in Step S101 or a moving average of time-series data of the pulse interval IP1. After that, the pre-processing portion 8*d* shifts the process to Step S106.

In the present embodiment, the pre-processing portion 8*d* derives an exponential moving average of the time-series data of the pulse interval IP1 measured in Step S101 as the measured value V1. In addition, the pre-processing portion 8*d* records the measured value V1 having been derived, in the secondary memory 83. The exponential moving average is an example of the moving average.

When the measured value V1 is the moving average of the time-series data of the pulse interval IP1, excessive changes in the measured value V1 due to electrical noise in the pulse are prevented. In addition, a process that derives the exponential moving average of the time-series data of the pulse interval IP1 is adopted, which can reduce a memory capacity for primary storage of the time-series data of the pulse interval IP1. The measured value V1 may be a weighted moving average of the time-series data of the pulse interval IP1.

Figure 5:
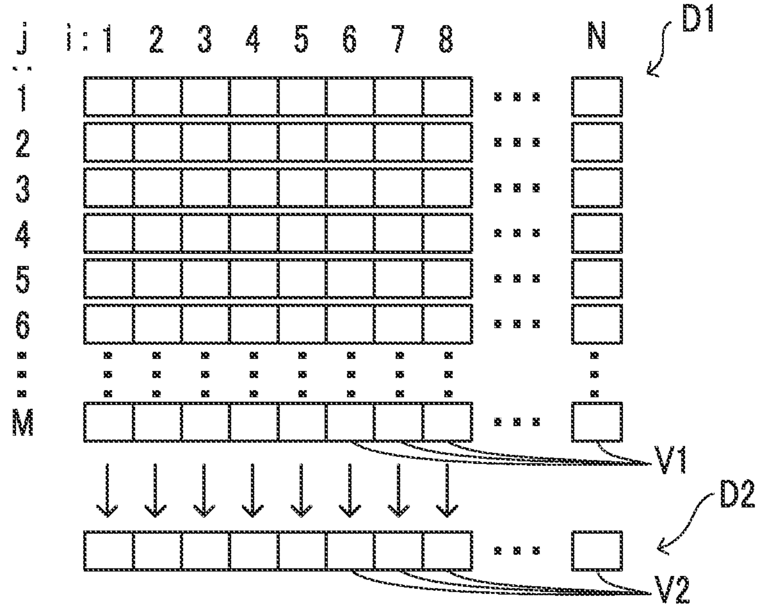
FIG. 5 is a diagram of an example of a configuration of measured data and reference data in the image forming apparatus according to the embodiment.

As illustrated in FIG. 5, the pre-processing portion 8*d* accumulates and records, by the process in Step S105, the measured value V1 in the secondary memory 83, per the phase number i. The pre-processing portion 8*d* records at least the latest M number of measured values V1 (i, 1) to V1 (i, M), per the phase number i, in the secondary memory 83. The number "M" corresponds to the number of predetermined cycle numbers.

Therefore, a data area capable of recording at least N multiplied by M number of measured values V1 (1, 1) to V1 (N, M) is maintained in the secondary memory 83, as a storing area of measured data D1 (see FIG. 5).

It is noted that the measured value V1 corresponding to a combination of the phase number i and the cycle number j is represented as V1 (i, j).

In Step S105, the pre-processing portion 8*d* records the measured value V1(i, j) in the storing area of the secondary memory 83, as a part of the measured data D1.

Step S106

In Step S106, the pre-processing portion 8*d* derives the reference value V2 (i) corresponding to the phase number i.

The reference value V2 (i) is a representative value of M number of measured values V1 (i, 1) to V1 (i, M) of the phase number i.

The pre-processing portion 8*d* records the derived reference value V2 (i) associated with the phase number i, in the secondary memory 83 (see FIG. 5). Accordingly, the reference data D2 including a plurality of reference values V2 (1) to V2 (N) corresponding to the plurality of rotational phases of the rotary encoder 6 is recorded in the secondary memory 83 (see FIG. 5).

In the present embodiment, the pre-processing portion 8*d* derives an average value of the M number of measured values V1 (i,1) to V1 (i, M) of the phase number i, as the reference value V2 (i).

The pre-processing portion 8*d* may derive a median value, a mode value, or the like having M number of the measured values V1 (i, 1) to V1 (i, M), as the reference value V2 (i).

In addition, the pre-processing portion 8*d* may derive an average value of remaining part of M number of the measured values V1 (i, 1) to V1 (i, M) that satisfy a predetermined excluded condition, as the reference value V2 (i).

For example, the excluded condition includes a first excluded condition and a second excluded condition. The first excluded condition is a condition that excludes a value having a predetermined number counted from the largest one, in M number of measured values from V1 (i, 1) to V1 (i, M). The second excluded condition is a condition that excludes a value having a predetermined number counted from the smallest one, in M number of measured values from V1 (i, 1) to V1 (i, M).

The pre-processing portion 8*d* derives the reference value V2 (i), further records the reference value V2 (i) in the secondary memory 83. After that, the process is shifted to Step S101. Accordingly, each time the rotary encoder 6 outputs the pulse, the processes of Step S101 to S106 are executed.

As described above, the pre-processing portion 8*d* measures the pulse interval IP1 for each of the plurality of rotational phases of the rotary encoder 6 (Step S101 in FIG. 4). As described above, the phase number i is the number that identifies each of the plurality of rotational phases.

In addition, each time the pulse interval IP1 is measured, the pre-processing portion 8*d* accumulates the measured value V1 corresponding to the measured pulse interval IP1 in association with corresponding one of the plurality of rotational phases, and records the measured value V1 in the secondary memory 83 (see Step S105 in FIG. 4 and FIG. 5).

In addition, the pre-processing portion 8*d* derives the reference value V2 (i) corresponding to each of the plurality of rotational phases based on measured value data recorded in the secondary memory 83 (see Step S106 in FIG. 4). Accordingly, the plurality of reference values V2 (1) to V2 (N) is derived. As described above, the reference value V2 (i) is the representative value of the M number of measured values V1 (i, 1) to V1 (i, M).

Interval Correction Control

Figure 6:
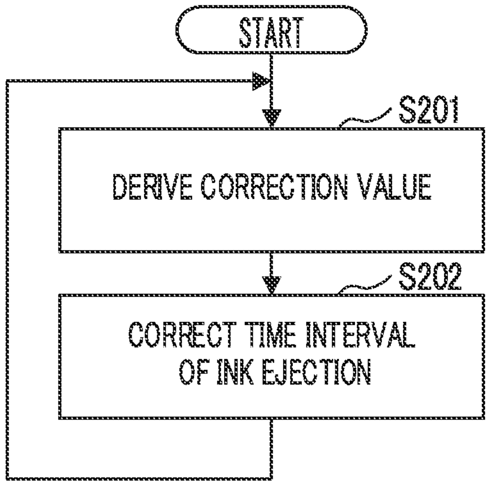
FIG. 6 is a flowchart of an example of steps of an interval correction control in the image forming apparatus according to the embodiment.

The print control portion 8*c* executes an interval correction control when causing the inkjet recording apparatus 4 to execute the print processing (see FIG. 6).

In the following, the measured value V1 (i, j) that is newly obtained each time the pulse is outputted from the rotary encoder 6 is referred to as a new measured value VI1. In addition, one of the plurality of reference values V2 (1) to V2 (N), which corresponds to the measured value VI1 newly obtained, is referred to as a new measured value VI2 (see the following equation 1). The new measured value VI2 corresponds to one of the plurality of rotational phases (1 to N) corresponding to the new measured value VI1.

Equation 1

$$VI1=V1(i,j),\ VI2=V2(i) \quad (1)$$

In the interval correction control, the print control portion 8*c* executes a process of Step S201 and a process of Step S202 indicated in FIG. 6.

The print control portion 8*c* executes the processes of Step S201 and Step S202 each time the print control portion 8*c* causes the inkjet recording apparatus 4 to execute ink ejection. This adjusts a time until the inkjet recording apparatus 4 executes subsequent ink ejection.

Step S201

In Step S201, the print control portion 8*c* derives a correction value V3 in accordance with a difference between the new measured value VI1 and the corresponding reference value VI2. The print control portion 8*c* newly derives the correction value V3 each time the new measured value VI1.

The correction value V3 is a value for correcting the time interval of ink ejection of the inkjet recording apparatus 4.

For example, the print control portion 8*c* applies the new measured value VI1 and the corresponding reference value VI2 to the following equation (2), thereby deriving the correction value V3. In the equation (2), a reference value VS1 is a predetermined value. The reference value VS1 is a standard value of the pulse interval IP1.

Equation 2

$$V3 = \frac{VI2 - VI2}{VS1} \tag{2}$$

Step S202

In Step S202, the print control portion 8*c* corrects the time interval of ink ejection of the inkjet recording apparatus 4 in accordance with the correction value V3.

For example, the print control portion 8*c* controls the inkjet recording apparatus 4 so that the time interval of ink ejection corresponds to a correction interval T1 that is derived by the following equation (3).

Equation 3

$$T1 = TS1(1+V3) \tag{3}$$

In the equation (3), a standard interval TS1 is a time interval of ink ejection corresponding to a time when the conveyance belt 331 of the first belt conveying device 33 rotates at a predetermined standard speed.

The pre-correcting process by the pre-processing portion 8*d* and the interval correction control by the print control portion 8*c* are examples of processes that realize the control method of the image forming apparatus 10.

As described above, the fluctuation factors of the rotation speed of the driven roller 333 include the fluctuation factors regarding the driven roller 333. The fluctuation factors regarding the driven roller 333 include a state of eccentric of the rotation shaft 333*a* of the driven roller 333 or vibration of the driven roller 333.

The fluctuation of the rotation speed of the driven roller 333 caused by the driven roller 333 occurs periodically in the driven roller 333. That is, the fluctuation of the rotation speed of the driven roller 333 caused by the driven roller 333 appears repeatedly in each rotational phase of the driven roller 333.

On the other hand, the fluctuation, which is not caused by the driven roller 333, of the rotation speed of the driven roller 333 appears only infrequently in the rotational phase of the driven roller 333. Therefore, the fluctuation of the rotation speed of the driven roller 333 which is not caused by the driven roller 333 is reflected only in a small part of M number of the measured values V1 (i, 1) to V1 (i, M), in each of the plurality of rotational phases.

In the present embodiment, the reference value V2 (i) corresponding to each of the plurality of rotational phases is the average value and the like of M number of the measured values V1 (i, 1) to V1 (i, M) corresponding to each of the plurality of rotational phases.

Therefore, the reference value V2 (i) represents the fluctuation of the rotation speed of the driven roller 333 mainly caused by the driven roller 333. The fluctuation of the rotation speed represented by the reference value V2 (i) has little effect on the rotation speed of the conveyance belt 331.

On the other hand, the fluctuation of the rotation speed of the driven roller 333 caused by the driven roller 333 and other fluctuations that affect the rotation speed of the conveyance belt 331 are reflected on the measured value V1 (i, j) that is newly obtained in each of the plurality of rotational phases.

In the present embodiment, the correction value V3 is a value based on a difference between the measured value V1 (i, j) that is newly obtained and the reference value V2 (i) corresponding to the measured value V1(i, j) (see the equation (2)).

Therefore, the correction value V3 is a value on which only fluctuation mainly affecting the rotation speed of the conveyance belt 331 is reflected. In the present embodiment, the time interval of ink ejection is corrected using such correction value V3, (see equation (3)).

The present embodiment is adopted, which correctly corrects the time interval of ink ejection of the inkjet recording apparatus 4 in accordance with the pulse interval IP1 of the rotary encoder 6.

In the present embodiment, the print control portion 8*c* executes the interval correction control at a cycle close to the standard interval TS1. On the other hand, the pre-processing portion 8*d* derives the plurality of reference values V2 (1) to V2 (N) at a cycle close to a cycle represented by the reference value VS1. Here, each of the reference values V2 (1) to V2 (N) is not always derived in synchronization with the cycle of the interval correction control.

Therefore, after the measured value V1 (i, j) is newly generated, the print control portion 8*c* may correct the time interval of ink ejection before derivation of the reference value V2 (i) corresponding to the above measured value V1 (i, j) that is newly obtained. In this case, the print control portion 8*c* derives the correction value V3 in accordance with the difference between the measured value V1 (i, j) that is newly obtained and the latest reference value V2 (i).

The latest reference value V2 (i) corresponds to one of the plurality of rotational phases (1 to N), which corresponds to the measured value V1 (i, j) that is newly obtained. That is, the phase number i corresponding to the latest reference value V2 (i) is the same as the phase number i corresponding to the measured value V1 (i, j) that is newly obtained.

In addition, the latest reference value V2 (i) is derived one time before the reference value V2 (i) that is newly obtained is derived based on the measured value V1 (i, j) that is newly obtained.

The reference value V2 (i) is not a value that significantly changes each time the driven roller 333 makes one rotation. Therefore, problems do not particularly occur even when the reference value V2 (i) derived before the reference value V2 (i) corresponding to the measured value V1 (i, j) that is newly obtained is used to derive the correction value V3. As such, the reference value V2 (i) used for deriving the correction value V3 is an example of the corresponding reference value VI2.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A control method of an image forming apparatus, the image forming apparatus comprising:
   - a conveyance belt;
   - an inkjet recording apparatus;
   - a rotor; and
   - a rotary encoder, wherein
   - the conveyance belt is driven in rotation and conveys a sheet,
   - the inkjet recording apparatus forms an image on the sheet by ejecting ink with respect to the sheet conveyed by the conveyance belt,
   - the rotor is rotated in conjunction with the conveyance belt, the rotary encoder outputs, by means of one detection sensor, a pulse each time the rotor rotates by a predetermined unit angle, the control method of the image forming apparatus includes:

measuring, by a processor, a pulse interval, which is a time interval between the pulse newly outputted from the rotary encoder and a last pulse, for a plurality of rotational phases of the rotary encoder;

each time the pulse interval is measured, accumulating, by the processor, a measured value, which is the pulse interval or a moving average of time-series data of the pulse interval in association with corresponding one of the plurality of rotational phases, and recording the measured value in a storage device;

deriving, by the processor, a plurality of reference values, corresponding to the plurality of rotational phases, based on measured value data recorded in the storage device during a plurality of rotations of the rotor;

each time the measured value is newly obtained, deriving, by the processor, a correction value of a time interval of ink ejection of the inkjet recording apparatus in accordance with a difference between a measured value that is newly obtained and a corresponding reference value that is one of the plurality of reference values; and correcting, by the processor, a time interval of ink ejection of the inkjet recording apparatus in accordance with the correction value, each of the plurality of reference values is an average value, a median value, or a mode value of data for a predetermined plurality of cycle numbers corresponding to each of the plurality of rotational phases in the measured value data, and the corresponding reference value corresponds to one of the plurality of rotational phases, which corresponds to the measured value that is newly obtained.

2. The control method of the image forming apparatus according to claim 1, wherein the processor derives an exponential moving average of the time-series data of the pulse interval as the measured value.

3. The control method of the image forming apparatus according to claim 1, wherein the processor derives the correction value by using the corresponding reference value derived before the reference value that is newly obtained is derived based on the measured value that is newly obtained, the corresponding reference value corresponding to one of the plurality of rotational phases, which corresponds to the measured value that is newly obtained.

4. An image forming apparatus comprising:

an endless conveyance belt that is driven in rotation and conveys a sheet;

an inkjet recording apparatus that ejects ink with respect to a sheet that is conveyed by the conveyance belt to form an image on the sheet;

a rotor that is rotated in conjunction with the conveyance belt;

a rotary encoder that outputs, by means of one detection sensor, a pulse each time the rotor is rotated at a predetermined unit angle; and a processor that achieves the control method of the image forming apparatus according to claim 1.

5. The image forming apparatus according to claim 4, comprising a plurality of supporting rollers that rotatably supports the conveyance belt, wherein the plurality of supporting rollers includes a drive roller that is driven in rotation by a motor and a driven roller that rotates along with rotation of the conveyance belt, and the rotor is the driven roller.

* * * * *